(12) United States Patent
Kurakane

(10) Patent No.: US 7,016,711 B2
(45) Date of Patent: Mar. 21, 2006

(54) MULTI-FUNCTION PORTABLE DATA-PROCESSING DEVICE

(75) Inventor: Hiroshi Kurakane, Tokyo (JP)

(73) Assignee: NEC Corporation, Tokyo (JP)

( * ) Notice: Subject to any disclaimer, the term of this patent is extended or adjusted under 35 U.S.C. 154(b) by 494 days.

(21) Appl. No.: 10/284,324

(22) Filed: Oct. 31, 2002

(65) Prior Publication Data

US 2003/0092470 A1   May 15, 2003

(30) Foreign Application Priority Data

Nov. 14, 2001   (JP) ............................ 2001-348238

(51) Int. Cl.
*H04B 1/38* (2006.01)

(52) U.S. Cl. .................................. 455/575.1; 345/168

(58) Field of Classification Search ............... 455/566, 455/550, 573.3, 575.1, 158.4; 345/173, 166, 345/168, 170, 156–158

See application file for complete search history.

(56) References Cited

U.S. PATENT DOCUMENTS

| 6,266,048 B1 | 7/2001 | Carau, Sr. |
| 6,611,252 B1 * | 8/2003 | DuFaux ...................... 345/168 |
| 6,614,422 B1 * | 9/2003 | Rafii et al. .................. 345/168 |

FOREIGN PATENT DOCUMENTS

| CN | 1269658 A | 10/2000 |
| EP | 0 982 676 A1 | 3/2000 |
| GB | 2 348 075 A | 9/2000 |
| JP | 55-53726 | 4/1980 |
| JP | 11-95895 | 4/1999 |
| JP | 2000-89899 | 3/2000 |
| WO | WO 00/20124 | 4/2000 |

* cited by examiner

*Primary Examiner*—Nay Maung
*Assistant Examiner*—Tu X. Nguyen
(74) *Attorney, Agent, or Firm*—Foley & Lardner LLP

(57) ABSTRACT

A cellular phone of folded type has a cover panel and a base panel coupled by a hinge for swiveling of the cover panel between a folded state and a developed state. The base panel mounts thereon a touch-sensitive panel whereas the cover panel mounts an image projector for projecting an image of keyboard information onto the touch-sensitive panel. The keyboard information includes a label for each of the keypads for designating the function of the keypad, and switched based on the input mode of the cellular phone.

16 Claims, 4 Drawing Sheets

MULTI-FUNCTION PORTABLE DATA-PROCESSING DEVICE

BACKGROUND OF THE INVENTION (a) Field of the Invention

The present invention relates to a portable data-processing device, and more particularly, to a multi-function portable data-processing device allowing an improved key input operation.

(b) Description of the Related Art

It is desired that portable data-processing devices, such as a cellular phone or personal digital assistant, have lighter weight as well as multiple functions. For example, the cellular phone generally has functions of telephone directory, receiving/transmitting e-mails and internet accessing besides the ordinary telephone function. For achieving the ordinary telephone function, it is generally sufficient that the cellular phone have a numerical keyboard. On the other hand, for achieving the telephone directory function or e-mail receiving/transmitting function, letter keyboards should be provided for inputting letters such as alphabetic characters or other characters. For a practical view point, however, it is generally impossible for the cellular phone having a limited scale to mount thereon such a letter keyboard besides the numerical keyboard. Thus, the cellular phone generally includes at most a numerical keyboard including numerical keypads for typing numerical characters including zero to nine, # keypad, * keypad, and some limited functional keypads on the operational panel which is disposed separately from a liquid crystal display (LCD) unit. Each of letters or symbols is allocated to one of these keypads, which enters different characters or symbols after iterative depression thereof to thereby reduce the number of keypads on the cellular phone.

Some portable data-processing device on the market has a touch-sensitive panel provided on the LCD unit, which generally represents thereon typed letters, telephone number or the contents of the e-mail. The touch-sensitive panel has a specific transparent film which is either a conductive film or a resistor film having a plurality of labeled portions to be depressed or touched, to allow execution of a specified function allocated to each labeled portion.

It should be noted however that, if the LCD unit provided as a single display unit on the cellular phone has a touch-sensitive panel function thereon, there arises an inconvenience that the ordinary representation on the screen of the LCD unit is difficult to observe. In addition, when the touch-sensitive panel is to be used as an input device on the screen of the LCD unit, all or some part of the screen of the LCD unit represents images for the touch-sensitive panel to nullify or limit the area for the ordinary representation on the screen. It may be considered to provide a dedicated LCD unit for the touch-sensitive panel function on the cellular phone in addition to a main LCD unit. In such a case, the main LCD unit can represent an ordinary image on the screen thereof even in the case where a plurality of functions are allocated to a single keypad or a full-keyboard is provided on the touch-sensitive panel. This increases the dimensions of the cellular phone however, and thus is difficult to employ.

SUMMARY OF THE INVENTION

It is therefore an object of the present invention to provide a portable data-processing device having multiple functions without providing a touch-sensitive panel function on a LCD unit or using a dedicated LCD unit for the touch-sensitive panel.

The present invention provides a portable data-processing device including a panel body having a front surface used for an input operation, an image projector for projecting a keyboard image including information of a keyboard onto the front surface, a control unit for detecting a function specified by an input operation on the front surface based on a location of the input operation.

In accordance with the portable data-processing device of the present invention, the image projector projecting an image of the keyboard information allows the user to input data by touching a desired keypad in the projected image of the keyboard, whereby the portable data-processing device need not have a dedicated LCD unit for a touch-sensitive panel or a touch-sensitive panel function on a LCD unit.

The above and other objects, features and advantages of the present invention will be more apparent from the following description, referring to the accompanying drawings.

PREFERRED EMBODIMENTS OF THE INVENTION

Figure 1:
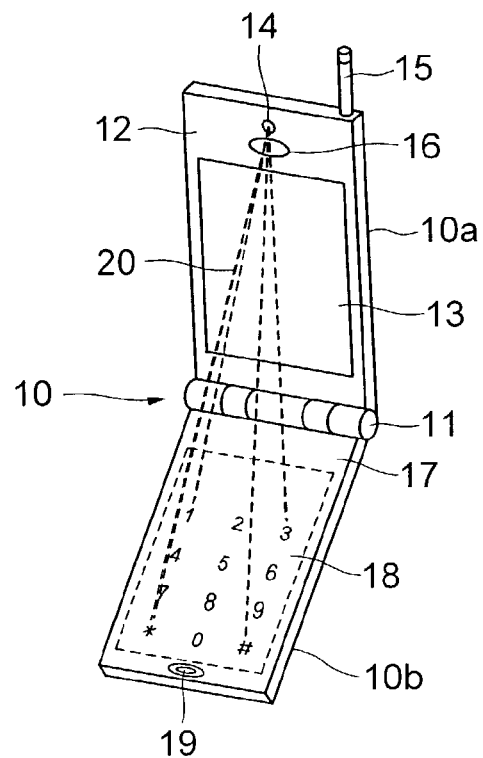
FIG. 1 is a perspective of a portable data-processing device according to a first embodiment of the present invention and implemented as a cellular phone.

Now, the present invention is more specifically described with reference to accompanying drawings, wherein similar constituent elements are designated by similar reference numerals.

Referring to FIG. 1, a portable data-processing device according to a first embodiment of the present invention is implemented as a cellular phone of a folded type.

The cellular phone, generally designated by numeral 10, includes a cover panel 10a and a base panel 10b coupled by a hinge 11 at the edges of both the panels 10a and 10b. The hinge 11 allows the cover panel 10a to be turned around the hinge 11 with respect to the base panel 10b between a folded state of the cellular phone 10 and a developed state thereof. The angle between both the panels 10a and 10b may be set at any desired angle by hand between substantially zero degree in the folded state and substantially 180 degrees in the full-developed state. The cover panel 10a mounts a LCD unit 13 of either monochrome or color on the front surface 12 of the cover panel 10a, i.e., inner surface opposing the base panel 10b in the folded state. The cover panel 10a also mounts thereon an image projector 14, an antenna 15, and a speaker 16 or earphone.

The base panel 10b has a touch-sensitive panel 18 and a microphone 19 on the front surface 17 thereof, i.e., the inner surface opposing the cover panel 10a in the folded state. The touch-sensitive panel 18 is plain and of solid color, and has no print of numerals or symbols on the key-input locations. In other words, the touch-sensitive panel has a plurality of unspecified key-input locations. Thus, user cannot know which location corresponds to a specific input function on the touch-sensitive panel 18 in the off-state of the image projector 14.

When user wishes to input some data on the touch-sensitive panel 18, the user determines a specific angle between the cover panel 10a and the base panel 10b to allow the image projector 14 to project a keyboard image 20 onto the touch-sensitive panel 18 by using laser beams etc. The keyboard image 20 projected on the touch-sensitive panel 18 includes an image of arrangement of the keypads for inputting numerals and symbols, images of pictures, letters and simple sentences in association with the keypads, including labels and/or specific functions of the keypads. The projected keyboard image is switched based on the mode of the input operation, such as a numeral, symbol or letter input mode. The user touches the location of a keypad in the projected image of the keyboard based on the label corresponding to a desired function. The surface of the touch-sensitive panel 18 used as a screen for the projected image should have a color or surface treatment which allows the user to clearly observe the projected image. In this respect, a black or red surface or a shiny surface is not preferable. It is preferable that the front surface of the touch-sensitive panel 18 have a white color and be subjected to an antireflection treatment.

In an alternative, the touch-sensitive panel 18 has a plurality of specified key-input locations such as obtained by printing the shapes of the keypads on the front surface. In this case, the keyboard image includes only a label projected on each specified location for indicating the function of the each specified location.

Figure 2:
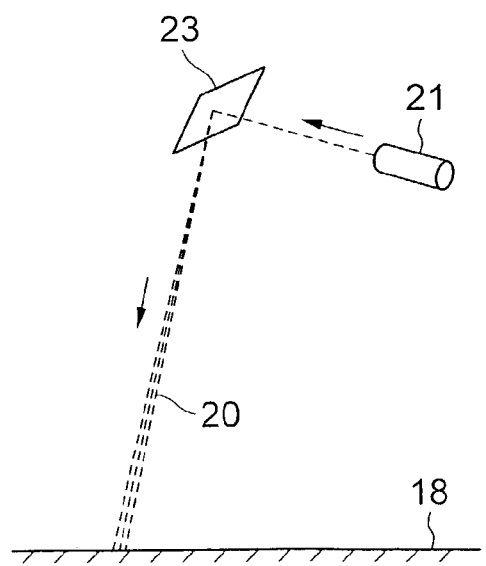
FIG. 2 is an explanatory perspective view showing the function of the image projection in the cellular phone of FIG. 1.

Referring to FIG. 2, there is shown the situation of image projection by the image projector 14. The image projector 14 includes a light source 21 provided inside the cover panel 10a, and a reflector 23 for reflecting the light emitted by the light source 21 to scan the touch-sensitive panel 18. The light source 21 may be a semiconductor laser device, a light emitting diode or an incandescent lamp of small dimensions and low power dissipation. The reflector 23 may be a digital micromirror device (DMD) IC, which has been used heretofore in a large-screen image projector. The DMD IC as used herein includes a large number of micromirrors arranged in a matrix on a silicon substrate, each micromirror being substantially of square having a side of as small as around 16 micrometers, for example.

Figure 3:
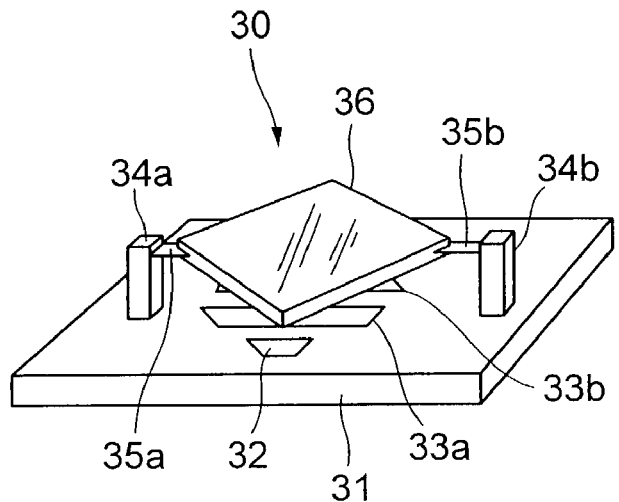
FIG. 3 is a perspective view of the typical structure of the reflector in the image projector implemented as a DMD in the cellular phone of FIG. 1.

Referring to FIG. 3, one of the micromirrors 30 in the DMD IC used as the reflector 23 in the present embodiment includes a pair of struts 34a and 34b formed on a silicon substrate 31 and having a hinge 35a and 35b, respectively, at the top thereof, and a micromirror body 36 supported by the struts 34a and 34b via the hinges 35a and 35b for swiveling. The micromirror body 36 is a thin film made of aluminum. Each micromirror 30 also includes a landing pad 32, and a pair of address electrodes 33a and 33b formed on the silicon substrate 31 and located between the pair of struts 34a and 34b. The DMD IC includes a large number of micromirrors 30 described above in a matrix on the silicon substrate 31.

Depending on the presence or absence of the voltages applied between the lading pad 32 and the address electrodes 33a and 33b, the micromirror body 36 swivels about the hinges 35a and 35b approximately by ±10 degrees. For example, the micromirror body 36 reflects the light from the light source 21 toward the touch-sensitive panel 18 when it resides at a swivel angle of +10 degrees, and reflects the light away from the touch-sensitive panel 18 when it resides at a swivel angle of −10 degrees. In short, presence or absence of the image projection by the image projector 14 onto the touch-sensitive panel 18 depends on the swivel angle of the micromirror body 36.

The DMD IC reflects the light from the light source 21 and projects an image having desired keyboard information onto the touch-sensitive panel 18, the desired keyboard information being controlled by the voltages applied between the address electrodes 33a and 33b and the landing pad 32 of the micromirrors 30. The image projector 14 scans the touch-sensitive panel 18 with the keyboard image similarly to a projection-type television.

In FIG. 1, when the cellular phone 10 is developed from the folded state, an angle sensor (not shown) provided on the hinge 11 detects the developed state and allows the image projector 14 to project the image of the keyboard information onto the touch-sensitive panel 18. The angle sensor detects the angle between the cover panel 10a and the base panel 10b, and controls the projection angle in the image projector 14 based on the detected angle, whereby the image of the keyboard information is constant for any angle being formed between the cover panel 10a and the base panel 10b. When the user touches the location of a specified keypad in the projected keyboard image, the touch-sensitive panel 18 delivers a specified signal corresponding to the touched location, whereby the cellular phone 10 executes the function corresponding to the specified keypad.

If a semiconductor laser device is used as the light source 21, there is a possibility that the reflected laser impinges on the eye of the user for a long time, which is undesirable. This may be avoided by setting the angle between the cover panel 10a and the base panel 10b at a specified angle. The specified angle is detected by the angle sensor on the hinge 11 during development of the cellular phone 10 for allowing the image projector 14 to project the keyboard image 20, and this angle is maintained by a spring function of the hinge 11. Thus, the projection by the image projector 14 is directed toward the touch-sensitive panel 18 at any time, not toward the eye of the user.

Figure 4:
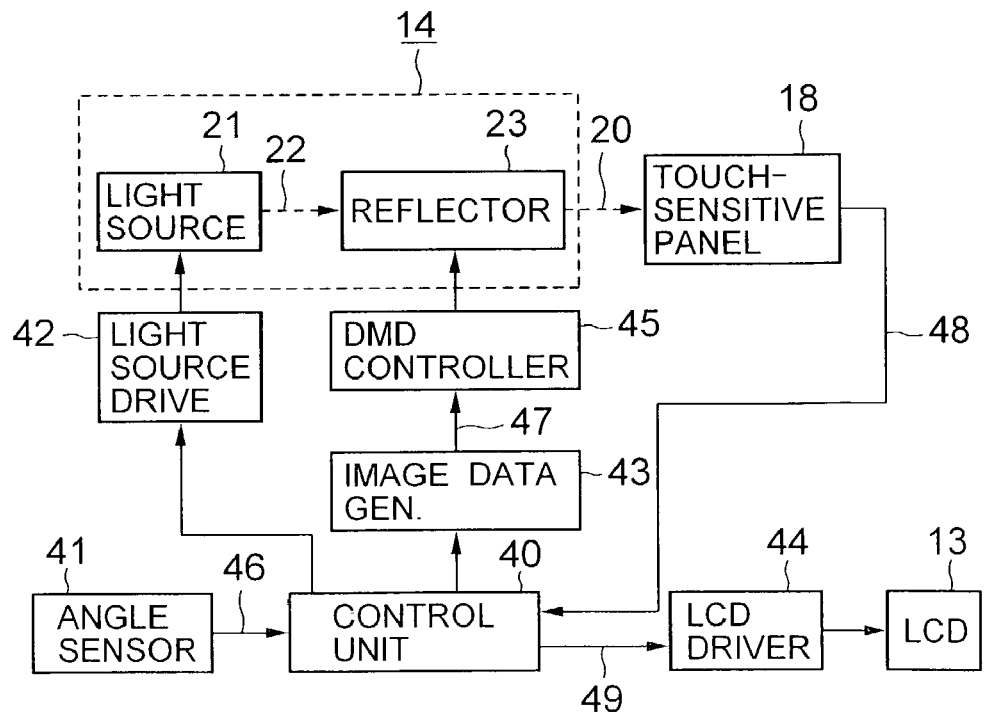
FIG. 4 is a block diagram of the control system of the cellular phone of FIG. 1.

Referring to FIG. 4, the control system of the cellular phone 10 of the present embodiment includes a main control unit 40 including therein CPU, ROM, RAM, and interfaces which are not specifically depicted. The control system also includes a LCD driver 44 for driving the LCD unit 13, the touch-sensitive panel 18, the angle sensor 41 for detecting the specified angle being formed between the cover panel 10a and the base panel 10b, a light source driver 42, and an image data generator 43, which are connected to the main control unit 40 and controlled thereby. The image data generator 43 delivers image data including the keyboard information to a micromirror controller 45, which controls the reflector 23.

The angle sensor 41 is provided on the hinge 11, and as described before, detects the specified angle being formed between the cover panel 10a and the base panel 10b during development of the cellular phone 10 to generate an angle signal 46, which indicates that a suitable angle is formed for projection of the keyboard image 20 by the image projector 14. Examples of the angle sensor 41 used herein include an optical device having a light emitting element and a light receiving element and having an ON/OFF function or encoder function, a mechanical sensor such as a mechanical switch having an ON/OFF function, a mechanical or electrical resistance sensor detecting a mechanical friction or an electric resistance, and a mercury switch detecting the specified angle to operate in an ON/OFF function.

In operation of the control system of the cellular phone 10, when the user develops the cellular phone 10 from the folded state, the angle sensor 41 generates an angle signal 46 after detecting the specified angle, and delivers the angle signal 46 to the main control unit 40. The main control unit 40 allows the light source driver 42 to turn on the light source 21, which emits light 22 continuously. The main control unit 40 also allows the image data generator 43 to generate image data 47 which includes information of the initial arrangement of the keyboard, which is generally used directly after the cellular phone 10 is developed. The micromirror controller 45 drives each micromirror 36 in the DMD IC of the reflector 23 based on the image data 47 generated by the image data generator 43, to allow the reflector 23 to form the image 20 of the initial keyboard information. The image 20 of the keyboard information includes limited information needed at each stage of key operation, to thereby simplify the projected image. The input mode may be iteratively switched by iteratively touching a specified keypad such as * keypad.

The image 20 of the keyboard information is projected onto the touch-sensitive panel 18 to represent a keyboard image such as shown in FIG. 1. Upon depression or touch of a desired keypad in the projected keyboard image, keypad information 48 corresponding to the location thus touched is delivered from the touch-sensitive panel 18 to the main control unit 40. The main control unit 40 generates an output signal corresponding to the keypad information and delivers the same to the LCD unit 13 via the LCD driver 44. Thus, the LCD unit 13 represents an image of numeral (or letter) corresponding to the keypad information on the touch-sensitive panel 18.

To save the power of the battery in the cellular phone 10, the image projection 20 by the image projector 14 is stopped after a specified time length is elapsed, which is somewhat longer than the mean time length needed for a key input operation by an average user. In addition, when the cellular phone 10 is folded after the developed state, the image projection 20 by the image projector 14 is stopped assuming that the user ended the input operation for the cellular phone 10.

In the present embodiment, a dedicated LCD unit for the touch-sensitive panel 18 is not needed in the cellular phone 10, thereby suppressing the increase of the scale of the cellular phone 10. In addition, a variety of different images or modes for the keyboard information can be provided by changing the keyboard arrangement, wherein each image corresponds to a single arrangement of the keyboard.

For example, a numerical keypad "2" corresponds to a variety of key functions including typing numeral "2", characters "A", "B" or "C" and other letters in a conventional keyboard, whereas each keypad in the projected image of the keyboard information corresponds to a single key function at the time of an input operation in the present embodiment. Further, the touch-sensitive panel 18 has a flat front surface for touching, differently from the ordinary keyboard, and accordingly, the projected image can be observed without a shadow such as caused by the ordinary keypad except for the shadow caused by hands of the user, for any mode of the projected image 20.

Figure 5:
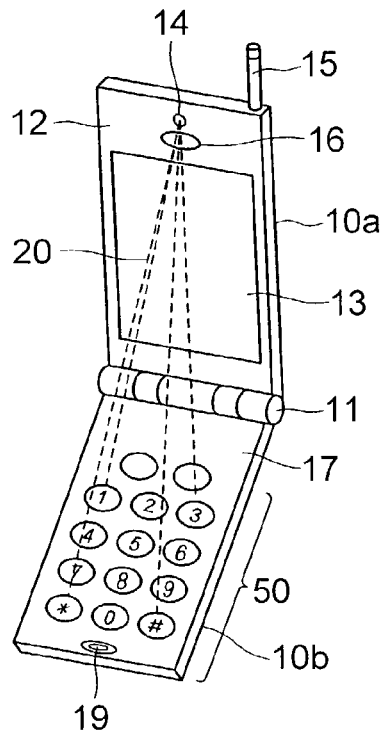
FIG. 5 is a perspective view of a portable data-processing device according to a second embodiment of the present invention.

Referring to FIG. 5, a cellular phone shown as a portable data-processing device according to a second embodiment of the present invention is similar to the first embodiment except that an ordinary keyboard 50 including a plurality of keypads is provided in the present embodiment instead of the touch-sensitive panel 18 in the first embodiment. The keyboard 50 is associated with a projected image of keypad information, which includes information of the label for each keypad and is selected from a variety of modes for the keyboard information. This configuration allows the user accustomed to an ordinary keyboard to depress each keypad without the sense of incompatibility.

Figure 6:
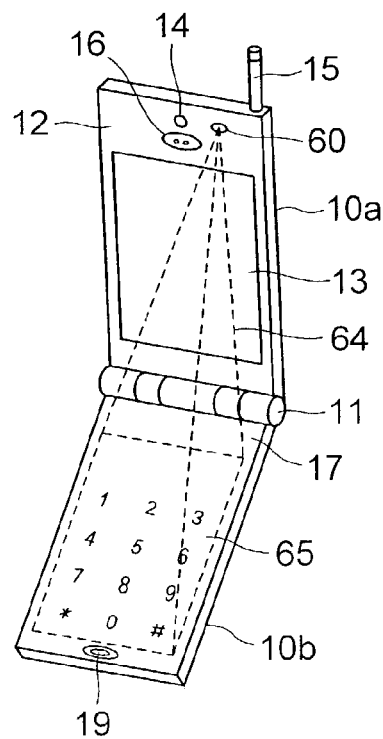
FIG. 6 is a perspective view of a portable data-processing device according to a third embodiment of the present invention.

Referring to FIG. 6, a cellular phone shown as a portable data-processing device according to a third embodiment of the present invention is similar to the cellular phone of FIG. 5 except that a CCD camera (or CMOS camera) is provided instead of the ordinary keyboard. The CCD camera 60 is adjusted in the focal length, depth of field, viewing angle etc. thereof so that the CCD camera 60 has a field 64 of view overlapping the area 65 of the keyboard image projected by the image projector 14. The CCD camera 60 receives the image of the location that the user touched for an input key operation. The image obtained by the CCD camera 60 produces information of the touched location which is labeled by the keyboard image projected by the image projector 14.

Figure 7:
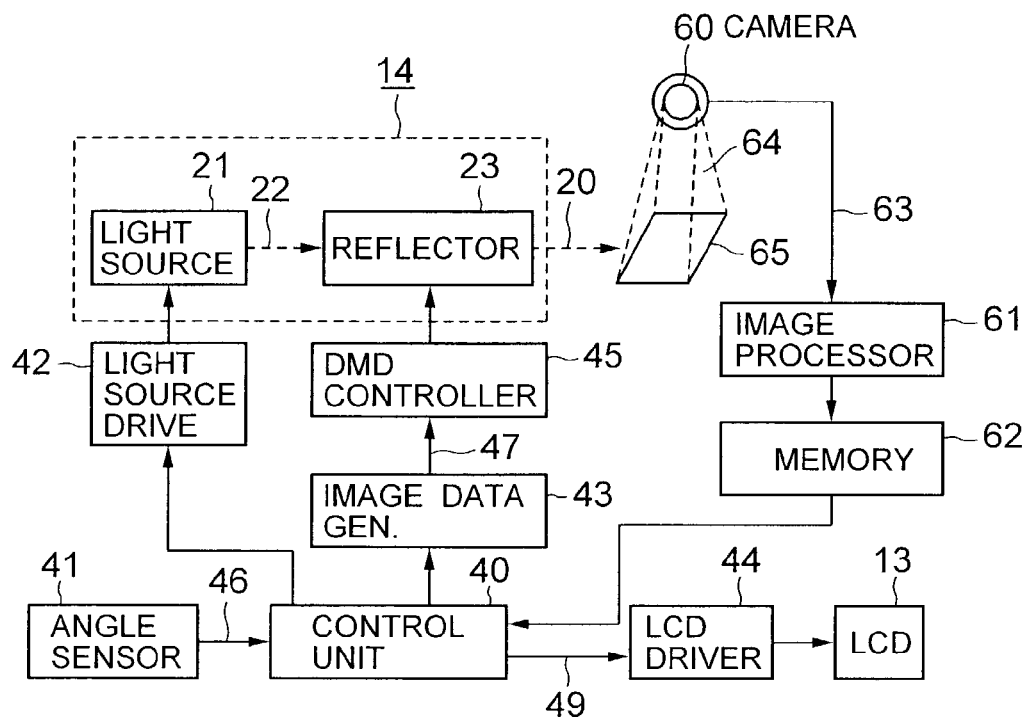
FIG. 7 is a block diagram of the control system of the portable data-processing device of FIG. 6.

Referring to FIG. 7, the control system of the cellular phone of the present embodiment is similar to the first embodiment except that the CCD camera 60, an image processing section 61 and a semiconductor memory 62 are provided in the present embodiment instead of the touch-sensitive panel 18 shown in FIG. 4. The image processing section 61 operates for digitally processing the image signal supplied from the CCD camera 60, and stores the resultant data in the semiconductor memory 62 for a while. The main control unit 40 reads out the data from the semiconductor memory 62 when the main control unit 40 needs the data.

In the third embodiment of FIGS. 6 and 7, after the cover panel 10a is developed from the folded state up to the specified angle with respect to the base panel 10b, the angle sensor 41 generates an angle signal 46 and delivers the same to the main control unit 40. The main control unit 40 controls the light source driver 42 to turn on the light source 21. The main control unit 40 also controls the image data generator 43 to deliver image data 47 specifying an initial arrangement of the keyboard to the micromirror controller 45. The micromirror controller 45 controls the micromirrors in the DMD IC of the reflector 23 based on the image data 47 to project the keyboard image 20 including information of the initial arrangement of the keyboard.

The initial keyboard arrangement specifies an ordinary numerical keyboard, such as shown in FIG. 6, including # and * keypads. When the user places his finger on the location of a desired keypad in the projected image, the image is received by the CCD camera 60, and the resultant image signal is processed by the image processing section 61 and then stored in the semiconductor memory 62. The main control unit 40 compares the image data before and after the user places his finger, to thereby extract the image of the finger and determine which keypad the finger specified. The main control unit 40 determines the letter specified by the keyboard based on the data read out from the ROM provided within the main control unit 40, and then delivers the key input information to the LCD unit 13 through the LCD controller 44 for representation of the letter.

By the configuration of the third embodiment, the base panel 10*b*, which does not mount either the touch-sensitive panel or the keyboard on the front panel 17 thereof, can be used for receiving therein other electric parts, whereby the dimensions of the cellular phone 10 can be reduced, especially in the thickness of the base panel 10*b*.

In the above embodiments the depicted cellular phones are of folded type; however, the cellular phone according to the present invention may be of a single panel type (flat panel type). For example, the cellular phones in the first and second embodiments may be such that the image projector 14 is provided on a pole coupled to the single panel body for swiveling, and is shifted over the touch-sensitive panel 18 or the keyboard 50 by the pole upon an input operation by the user.

Figure 8:
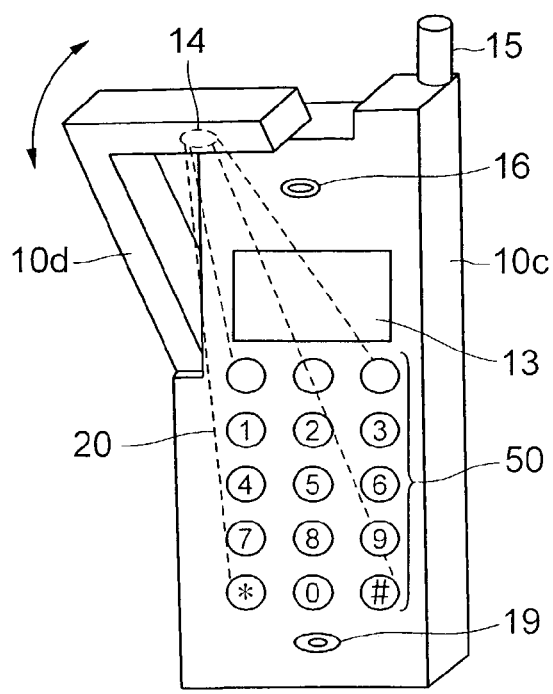
FIG. 8 is a perspective view of a portable data-processing device according to a fourth embodiment of the present invention.

Referring to FIG. 8, a cellular phone shown as a portable data-processing device according to a fourth embodiment of the present invention has a single panel body 10*c*. The cellular phone mounts a speaker 16, a LCD unit 13, keyboard 50, and a microphone 19 on the front surface of the panel body 10*c*, and an antenna 15 on the top surface thereof in the vicinity of the corner of the panel body 10*c*. The cellular phone also has an L-shape arm 10*d* coupled to the left side of the panel body 10*c* for swiveling of the L-shape arm 10*d* at the end of the longer bar of the L-shape arm 10*d*. The L-shape arm 10*d* is swiveled between a first position at which the shorter bar of the L-shape arm 10*d* mounting thereon the image projector 14 opposes the top surface of the panel body 10*c*, and a second position at which the image projector 14 mounted on the shorter bar projects a keyboard image onto the front surface of the panel body 10*c*.

The keyboard image 20 includes only labels of the keypads in the depicted example, wherein a keyboard 50 is provided on the panel body 10*c*. The keyboard 50 may be replaced by a touch-sensitive panel such as 18 shown in FIG. 1. Alternatively, the keyboard image 20 may include an image of keypads of the keyboard as well as an image of the labels of the keypads, in the case of a CCD camera being provided on the L-shape arm 10*d*. Flexible wires for connecting the image projector 14 and the electronic parts in the panel body 10*c* are received inside the L-shape arm 10*d*. The control system of the present embodiment may be such that shown in FIG. 4. The swivel angle of the L-shape arm 10*d* with respect to the panel body 10*c* is detected by an angle sensor such as 41 shown in FIG. 4.

In the cellular phone shown in FIG. 8, the L-shape arm 10*d* is received in the first position when the cellular phone is carried by the user or when the input operation is not needed. For executing a key input operation, the L-shape arm 10*d* is swiveled to the second position at which the shorter bar of the L-shape arm 10*d* mounting thereon the image projector 14 overhangs the panel body 10*c*. The angle sensor detects the specified angle of the L-shape arm 10*d* with respect to the panel body 10*c* to deliver an angle signal 46. The main control unit 40 controls the image projector 14 to project the keyboard image 20 including label information onto the keyboard 50.

In the depicted example of the fourth embodiment, the L-shape arm 10*d* is coupled to the side surface of the panel body 10*c*; however, the L-shape arm 10*d* may be provided on the other surface of the panel body 10*c*, for example, on the top surface thereof. In this case, the L-shape arm 10*d* is swiveled in another direction such as normal to the depicted example. The L-shape arm 10*d* may be replaced by a telescope rod having a configuration similar to the antenna.

The touch-sensitive panel, actual keyboard or image keyboard as described above may be operated by a pen having a sharp tip instead of the finger. The portable data-processing device of the present invention may be a personal handy phone, a personal digital assistant etc. so long as the portable data-processing device receives input information from the keyboard function.

Since the above embodiments are described only for examples, the present invention is not limited to the above embodiments and various modifications or alterations can be easily made therefrom by those skilled in the art without departing from the scope of the present invention.

What is claimed is:

1. A portable data-processing device comprising:
   a panel body having a front surface used for an input operation;
   an image projector for projecting a keyboard image including information of a keyboard onto said front surface;
   a control unit for detecting a function specified by an input operation on said front surface based on a location of said input operation; and
   a camera having a field of view overlapping an area of said keyboard image,
   wherein said control unit detects the input operation based on an image signal obtained by said camera,
   wherein said panel body includes a cover panel and a base panel coupled with a hinge,
   said cover panel mounts said image projector and said camera, and said base panel mounts said front surface.

2. A portable data-processing device comprising:
   a panel body having a front surface used for an input operation;
   an image projector for projecting a keyboard image including information of a keyboard onto said front surface;
   a control unit for detecting a function specified by an input operation on said front surface based on a location of said input operation; and
   an arm for mounting said image projector, wherein said arm is coupled to said panel body for swiveling.

3. A portable data-processing device comprising:
   a panel body having a front surface used for an input operation;
   an image projector for projecting a keyboard image including information of a keyboard onto said front surface; and
   a control unit for detecting a function specified by an input operation on said front surface based on a location of said input operation,
   wherein said panel body includes a cover panel and a base panel coupled with a hinge, said cover panel mounts said image projector, and said base panel mounts said front surface.

4. The portable data-processing device according to claim 1, wherein said image projector projects said keyboard image when an angle of said cover panel with respect to said base panel becomes a specified angle.

5. The portable data-processing device according to claim 1, wherein said image projector includes a light source and a reflector having a plurality of micromirrors each controlled by said information of the keyboard.

6. The portable data-processing device according to claim 1, wherein said portable data-processing device is a cellular phone, a personal digital assistant or a personal handy phone.

7. The portable data-processing device according to claim 1, wherein said keyboard image includes images of keypads, pictures, sentences and/or labels for said keypads.

8. The portable data-processing device according to claim 1, wherein said image projector projects a selected one of a plurality of keyboard images.

9. The portable data-processing device according to claim 2, wherein said image projector includes a light source and a reflector having a plurality of micromirrors each controlled by said information of the keyboard.

10. The portable data-processing device according to claim 2, wherein said portable data-processing device is a cellular phone, a personal digital assistant or a personal handy phone.

11. The portable data-processing device according to claim 2, wherein said keyboard image includes images of keypads, pictures, sentences and/or labels for said keypads.

12. The portable data-processing device according to claim 2, wherein said image projector projects a selected one of a plurality of keyboard images.

13. The portable data-processing device according to claim 3, wherein said image projector includes a light source and a reflector having a plurality of micromirrors each controlled by said information of the keyboard.

14. The portable data-processing device according to claim 3, wherein said portable data-processing device is a cellular phone, a personal digital assistant or a personal handy phone.

15. The portable data-processing device according to claim 3, wherein said keyboard image includes images of keypads, pictures, sentences and/or labels for said keypads.

16. The portable data-processing device according to claim 3, wherein said image projector projects a selected one of a plurality of keyboard images.

* * * * *